J. BAKER.
Wire-Cutter.
No. 220,566. Patented Oct. 14, 1879.
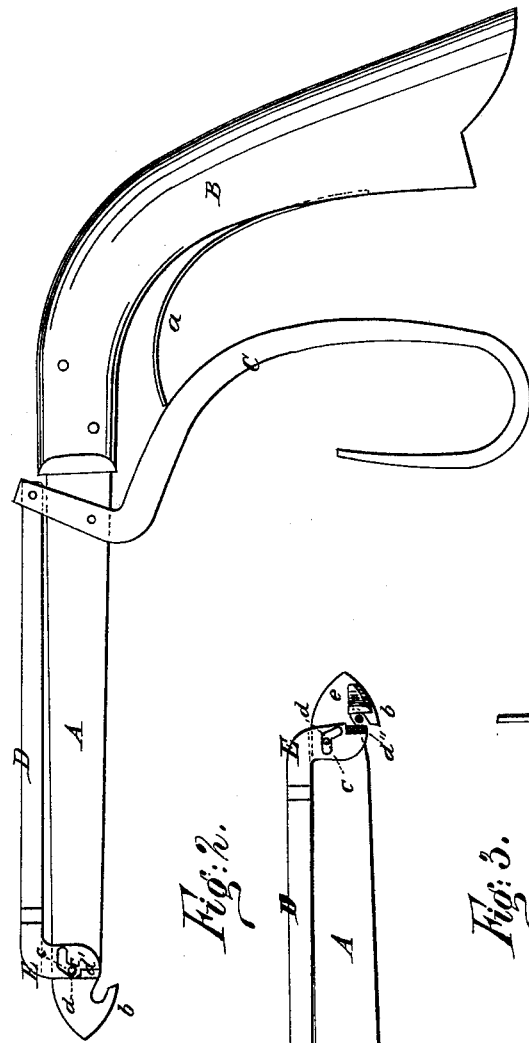
WITNESSES:
Chas. Nider
C. Sedgwick
INVENTOR:
J. Baker
BY Munn &Co
ATTORNEYS.

UNITED STATES PATENT OFFICE.

JOSEPH BAKER, OF LEBANON, OHIO.

IMPROVEMENT IN WIRE-CUTTERS.

Specification forming part of Letters Patent No. 220,566, dated October 14, 1879; application filed August 5, 1879.

*To all whom it may concern:*

Be it known that I, JOSEPH BAKER, of Lebanon, in the county of Warren and State of Ohio, have invented a new and Improved Wire-Cutter, of which the following is a specification.

My invention relates to an improved implement for cutting the wire bands with which sheaves of grain are bound; and the object of the improvement is to facilitate the catching and cutting of the wire and to enable it to be quickly withdrawn from the sheaf after it is cut.

It consists of a blade with a hook at one end, and at the other a stock and bent lever connecting with one end of a rod on top of the blade, the other end whereof has a right-angular forked projection fitting over the blade, to which it is connected by pivots working in V-shaped slots in the fork. On one side of the fork is a cutting-bit, and on the other a clamping-edge opposite a lug attached to the end of the blade. The wire being caught by the open hook, the forked projection is thrown forward, severing the wire, one end of which is caught between the clamping-edge and the lug, and thus drawn from the sheaf.

In the accompanying drawings, Figure 1 is a side view of my improved implement, showing the cutting-bit, and with the hook open. Fig. 2 is a view of the opposite side of the blade, showing the manner of clamping the wire; and Fig. 3 is a top or edge view of the blade and the cutting and clamping attachment.

Similar letters of reference indicate corresponding parts.

Referring to the drawings, A is the blade, having at one end a curved handle or stock, B, like a pistol-stock. C is a lever, the upper end whereof is fulcrumed to the blade a short distance from the fixed end of the handle, while below the fulcrum the lever is carried backward and downward like the handle. A spring, *a*, attached to the stock and bearing on the lever, throws it forward.

The end of blade A opposite the handle is pointed, and in its under edge is formed a backwardly-projecting hook, *b*.

D is a bar or rod placed above the blade, and pivoted at its rear end to the upper end of the lever. At the forward end it is bent down and forked, forming a right-angular projection, E, in each jaw whereof is a V-shaped slot, *c*, one limb whereof is bent down at an obtuse angle to the other. Studs *d*, projecting from each side of the blade into these slots, connect the projection with the blade.

Below the slot the forward edge of one jaw is formed into a cutting-bit, *d'*, and the corresponding edge of the other jaw is formed into a biting or clamping edge, *d''*, set slightly back of *d'*. On the side of the blade next to edge *d'*, and between the hook and extremity of the blade, is fixed a backwardly-projecting lug, *e*.

The implement is used in the following way: The spring throws the lever forward, drawing the rod D back, and the studs *d*, working against the sides of the slot, throw the end of the rod up and leave the hook altogether uncovered, as in Fig. 1. On drawing the lever back the rod D is thrown forward, and the studs guide the projection E down first across the entrance to the hook and then forward, so that when about to be used the parts are in the position they occupy in Fig. 1. The hook *b* is caught over the wire band, (the pointed end of the blade permitting it to enter the straw readily, to enable the hook to engage the wire;) the lever is then drawn back, throwing the projection downward and forward, causing the bit to sever the wire, and as soon as this is done the clamping-edge catches the end of the wire passing through the hook and clamps it against the lug *e*, holding it securely, and enabling it to be quickly withdrawn from the sheaf.

The advantages of this improvement are many. In the first place, the movement in operating it is simple and easy. Its construction enables the band to be caught without difficulty, and the hook is so small that it is not liable to catch the straws; moreover, it is simple and economical in construction.

Having thus fully described my invention, I claim as new and desire to secure by Letters Patent—

1. As an improvement in wire-cutters, the blade A, with stock B at one end and a hook, *b*, at the opposite end, in combination with the forked projection E, provided with the V- shaped slots $c$, working over lugs $d$ and cutting-edge $d'$, said projection being connected, through rod D, with lever C, fulcrumed to the blade and provided with a spring, $a$, for throwing it forward, whereby the said projection E is adapted to be drawn backward and upward, leaving the hook uncovered, and to be thrown downward and forward to cut the wire in the hook, substantially as described.

2. The combination of projection E, having clamping-edge $d''$, and blade A, provided with hook $b$ and lug $e$ on the side of the blade next to the clamping-edge, and between the hook and extremity of the blade, whereby when the band is cut the end passing through the hook is caught between the said clamping-edge and the lug $e$, and held for the purpose of drawing the band from the sheaf, substantially as described.

JOSEPH BAKER.

Witnesses:
GEO. W. CAREY,
D. W. JONES.